US012644053B2

(12) United States Patent
Adams et al.

(10) Patent No.: US 12,644,053 B2
(45) Date of Patent: Jun. 2, 2026

(54) ASPHALT MATERIALS FROM WIND TURBINE BLADES AND OTHER COMPOSITE MATERIALS

(71) Applicant: WESTERN RESEARCH INSTITUTE, Laramie, WY (US)

(72) Inventors: Jeramie Joseph Adams, Laramie, WY (US); Jean-Pascal Planche, Laramie, WY (US); Seth Taylor Bassham, Laramie, WY (US); Alex Mitchell Literati, Laramie, WY (US)

(73) Assignee: Western Research Institute, Laramie, WY (US)

( * ) Notice: Subject to any disclaimer, the term of this patent is extended or adjusted under 35 U.S.C. 154(b) by 128 days.

(21) Appl. No.: 18/560,869

(22) PCT Filed: Jul. 5, 2022

(86) PCT No.: PCT/US2022/036102
§ 371 (c)(1),
(2) Date: Nov. 14, 2023

(87) PCT Pub. No.: WO2023/287607
PCT Pub. Date: Jan. 19, 2023

(65) Prior Publication Data
US 2024/0254397 A1 Aug. 1, 2024

Related U.S. Application Data

(60) Provisional application No. 63/348,638, filed on Jun. 3, 2022, provisional application No. 63/220,885, filed on Jul. 12, 2021.

(51) Int. Cl.
C08J 11/08 (2006.01)
C10C 3/00 (2006.01)
C10C 3/08 (2006.01)

(52) U.S. Cl.
CPC ............... C10C 3/007 (2013.01); C08J 11/08 (2013.01); C10C 3/08 (2013.01); *C08J 2395/00* (2013.01)

(58) Field of Classification Search
CPC ... B09B 2101/17; B09B 2101/75; B09B 3/40; C08J 11/08; C08J 2395/00;
(Continued)

(56) References Cited

U.S. PATENT DOCUMENTS 10,640,712 B2 5/2020 Kotefski et al.
10,662,384 B2 5/2020 Rovani, Jr. et al.
(Continued)

FOREIGN PATENT DOCUMENTS

CN 100564438 12/2009
JP 2003/112153 4/2003
(Continued)

OTHER PUBLICATIONS

AASHTO Provisional Standard pp. 113-121. Delta Tc Binder Specification Parameter. FHWA-HIF-21-042. Tech Brief. Sep. 2021.
(Continued)

*Primary Examiner* — Ellen M Mcavoy
*Assistant Examiner* — Chantel Graham
(74) *Attorney, Agent, or Firm* — Leydig, Voit & Mayer, Ltd.

(57) ABSTRACT

A method for converting a fiber reinforced composite material into a softening or recycling agent or product for hard asphalt or bitumen may include contacting a fiber reinforced composite material with a solvent, and converting at least some of the fiber reinforced composite material into a liquid product. The softening step may include, contacting the hard asphalt with the liquid product to produce a softened or rejuvenated asphalt. The fiber reinforced composite material may include a solid organic thermoset material and fibers.
(Continued)

The hard asphalt may be obtained by petroleum refining, polymer modification or field aging.

26 Claims, 8 Drawing Sheets

(58) Field of Classification Search
CPC .. C08L 2207/20; C08L 2555/30; C10C 3/007; C10C 3/08; E01C 7/262; Y02W 30/62
See application file for complete search history.

(56) References Cited

U.S. PATENT DOCUMENTS

| | | | |
|---|---|---|---|
| 2013/0067991 | A1 | 3/2013 | Schabron et al. |
| 2017/0081516 | A1 | 3/2017 | Yoo et al. |
| 2017/0204267 | A1 | 7/2017 | Ferguson et al. |
| 2018/0057686 | A1 | 3/2018 | Williams et al. |
| 2018/0334620 | A1* | 11/2018 | Kotefski .................. C10C 1/18 |
| 2022/0154075 | A1 | 5/2022 | Adams et al. |

FOREIGN PATENT DOCUMENTS

| | | |
|---|---|---|
| JP | 2004/210969 | 7/2004 |
| WO | WO 2019/209400 | 10/2019 |

OTHER PUBLICATIONS

Adams et al. (2015) "Quantitative Vacuum Distillation of Crude Oils to Give Residues Amenable to the Asphaltene Determinator Coupled with Saturates, Aromatics, and Resins Separation Characterization," Energy Fuels, 29, 2774-2784.
Aldosari (Jul.-Aug. 2020) "Manufacturing carbon fibres from pitch and polyethylene blend precursors: a review," J mater res technol. 9(4): 7786-7806.
Bajaj et al. (Nov. 2020) "Evaluation and Classification of Recycling Agents for Asphalt Binders," Construction and Building Materials 260, 119864: 1-12. https://doi.org/10.1016/j.conbuildmat.2020.119864.
Bowers et al. (Nov. 2020) "2020 could be a record year for U.S. wind turbine installations." EIA, https://www.eia.gov/todayinenergy/detail.php?id=45856.
Boysen et al. (2013) "The Automated Asphaltene Determinator Coupled with Saturates, Aromatics, Resins Separation for Petroleum Residua Characterization," Energy Fuels, 27, 4654-4661.
Chen et al. (2002) "Petroleum Pitch: Exploring a 50-year Structure Puzzle with Real-Space Molecular Imaging," Carbon. 161: 456-465.
Chen et al. (Jan. 2021) "The Role of Methyl Groups in the Early Stage of Thermal Polymerization of Polycyclic Aromatic Hydrocarbons Revealed by Molecular Imaging," Energy Fuels, 35, 3, 2224-2233.
Cousins et al. (2019) "Recycling Glass Fiber Thermoplastic Composites form Wind Turbine Blades," J. of Cleaner Production. 209: 1252-1263. https://doi.org/10.1016/j.jclepro.2018.10.286.

Enieb et. al. (Jan. 2021) "Short- and Long-term Properties of Glass Fiber Reinforced Asphalt Mixtures," International Journal of Pavement Engineering. 22: 64-76.
EPA (Nov. 2023) "Cleaning Up Electronic Waste (E-Waste)," EPA, https://www.epa.gov/international-cooperation/cleaning-electronic-waste-e-waste.
Extended European Search Report dated May 6, 2025 in corresponding European Application No. 22842657.3.
Federal Highway Administration Publication FHWA-HRT-15-055 (2016) "Automated High-Performance Liquid Chromatography Saturate, Aromatic, Resin, and Asphaltene Separation," FHWA, U.S. Department of Transportation: Washington, D.C.
Gopalraj et al. (Feb. 2020) "A Review on the Recycling of Waste Carbon Fiber/Glass Fiber-reinforced Composites: Fiber Recovery, Properties and Life-cycle Analysis," SN Applied Sciences, 2, 433.
International Search Report and Written Opinion, dated Sep. 27, 2022, corresponding to International Application No. PCT/US2022/036102, (from which the present application claims priority,) 18 pp.
Kim et al. (Aug. 2022) "Recycling Studies of Epoxy Fiber-Reinforced Composites," In: Mavinkere Rangappa, S., Parameswaranpillai, J., Siengchin, S., Thomas, S. (eds) Handbook of Epoxy/Fiber Composites . Springer, Singapore. https://doi.org/10.1007/978-981-19-3603-6_46.
Kuang et al. (2018) "Disolution of Epoxy Thermosets via Mild Alcoholysis: the Mechanism and Kinetics Study," RSC Advances. 8: 1493-1502. https://doi.org/10.1039/c7ra12787a.
Mir et al. (Mar. 2022) "A Comprehensive Review on the Recycling of Discarded Printed Circuit Boards for Resource Recovery," Resources, Conservation and Recycling. 178, 106027.
Moins et al. (Feb. 2022) "On the Road Again! An Economic and Environmental Brake-even and Hotspot Analysis of Reclaimed Asphalt Pavement and Rejuvenators," Resources, Conservation and Recycling. 117, 106014.
NREL Transforming Energy (Feb. 2021) "NREL Research Identifies Motivations, Methods for Achieving a Circular Economy for Wind Energy," NREL, https://www.nrel.gov/news/program/2021/nrel-research-identifies-motivations-methods-for-achieving-a-circular-economy-for-wind-energy.html.
Pakdel et al. (Mar. 2021) "Recent Progress in Recycling Carbon Fiber Reinforced Composites and Dry Carbon Fiber Wastes," Resources, Conservation and Recycling. 116, 105340.
Planche et. al. (Feb. 1-3, 2022) "WRI2 = WRI's Waste Re-engineering Initiative," Association of Modified Asphalt Producers, Sustainable Asphalt Performance that Lowers Environmental Impact, 23rd Annual Conference, Houston, Texas.
Qureshi (Dec. 2022) "A Review of Recycling Methods for Methods for Fibre Reinforced Polymer Composites" Sustainability 14, 16855.
Red (2008) "Wind turbine blades: Big and getting bigger" CW CompositesWorld, https://www.compositesworld.com/articles/wind-turbine-blades-big-and-getting-bigger.
Sohaili et al. (2012) "A Review on Printed Circuit Boards Waste Recycling Technologies and Reuse of Recovered Nonmetallic Mateirals," International Journal of Scientific and Engineering Research. 3: 1-7.
Williams et. al. (Dec. 2021) "Asphalt Pavement Industry Survey on Recycled Materials and Warm-Mix asphalt Usage: 2020," Information Series 138 (11th Edition).

* cited by examiner

ASPHALT MATERIALS FROM WIND TURBINE BLADES AND OTHER COMPOSITE MATERIALS

CROSS-REFERENCE TO RELATED APPLICATIONS

This application is a U.S. National Stage Application filed under 35 U.S.C. § 371 of International Application No. PCT/US2022/036102, filed Jul. 5, 2022, which application claims the benefit of priority to U.S. Provisional Patent Application No. 63/220,885 filed Jul. 12, 2021, and U.S. Provisional Patent Application No. 63/348,638 filed Jun. 3, 2022 each of which is hereby incorporated by reference in its entirety.

BACKGROUND OF INVENTION

Fiber reinforced composites are widely used in many applications such as renewable wind energy generation, aerospace, transportation, defense, building and construction, insulation, electronics and sporting goods. The markets for these composites has continued to grow rapidly and show consistent growth year over year, even despite Covid.[2] Currently there are no widely accepted strategies to recycle or upcycle these composites and their fate is often in landfills. Some fiber reinforced composites can be separated back into thermoset resins, fibers and other components using various solvents at ambient or elevated temperatures. However, many of these technologies are specific to the thermoset resin chemistry, and the ability to reuse the resins in other composite applications often depends on producing a high purity recovered resin that has very low levels of degradation and contaminants. Therefore, to handle real world waste streams, generic technologies that are blind to the resin chemistry and tolerant of contaminants and degradation are necessary. Of particular interest are technologies which upcycle the resins from a wide range of chemistries and contaminated streams to produce materials useful for high volume, non-consumable, and circular materials markets such as asphalt binder (or bituminous binder).

Current fiber reinforced thermoset composites are not easily recycled to a virgin pristine state so that they can be reused in original high-end applications. Several routes have been proposed to recycle composites including solvent extraction, pyrolysis and acid digestion.[3] Due to the very high ash content in fiberglass composites, pyrolysis is not favored since it requires imputing a large amount of energy just to degrade the low levels or resins (15-35%). Additionally, pyrolysis produces other small molecules, gas and greenhouse gas (GHG) that are other waste side products. Chemical methods, or solvent methods, to recover fibers are preferred because the footprint for chemical recycling can be six times less than pyrolysis while greenhouse gas emissions can be five times less.[4] Most chemical methods rely on acid digestion of the epoxy or the use of solvents. Acid digestion methods can be costly to implement in large-scale processes and generate corrosion which is very problematic. Recently, novel resins have been designed so that they can be recovered and reused,[5] however multiple recovery and reuse for high-end applications are still debatable due to degradation of performance and increasing contamination with impurities.

Asphalt is the most recycled material in the world. It is fairly easy to recycle a pavement using low dosages of reclaimed asphalt pavement (RAP) but it becomes more difficult to recycle higher amounts of RAP without the addition of special additives which are used to soften the old aged (oxidized) asphalt. Recycling agents, sometimes called softener or rejuvenators, is a growing industry and it is expected to continue to grow to meet circular economic demands.

SUMMARY OF THE INVENTION

A new generic upcycling method for thermoset resins, or epoxy resins, has been performed using thermochemical methods with solvents consisting of amines, alcohols, or acids (typically carboxylic, but can be phenolic) to produce low viscosity oils for asphalt applications. These oils have good compatibility with asphalt and can be used to soften hard grade asphalts, reclaimed asphalt pavements (RAP) and reclaimed asphalt shingles (RAS). Adding renewable carbon from solvents such as fatty amines, fatty acids and fatty alcohols increases the molecular weight of the decomposed resin molecules, adds additional functionality and tunes the physical properties. With regards to functionality, amines increase the basic nitrogen content of the resulting product which imparts additional adhesion properties with mineral filler or aggregate in asphalt applications and can work to reduce moisture damage, or water stripping. Ketone and ester functional groups can also help improve adhesion and water stripping. These soft oils can also work as warm mix additives to reduce the temperature of asphalt paving operations or additives to improve compaction during paving operations. Solvents with long linear alkyl chains ($\geq$C16) can change lubrication properties and the material appearance to a waxy type of product which is especially useful for warm mix applications. Other possible applications can be as an extender, a workability improver, lubricants, cutting fluids, drilling fluids and grease.

Rejuvenators are necessary to recycle more than 20% RAP in new pavement construction to prevent premature damage and failure and increase the recycling consumption of old pavements. Rejuvenator markets have been steadily growing for more than 10 years, and it is estimated to be around 100,000 tons/year. Some rejuvenators from aromatic oils and bio-derived sources lose their softening benefits relatively quickly due to oxidation, sometimes being more oxidation sensitive than asphalt. Other more stable products, such as aliphatic products from re-refined engine oil bottoms (REOB) or vacuum tower asphalt extender (VTAE), can have compatibility issues with asphaltenes within asphalt.

In one embodiment, a method for converting a fiber reinforced composite material into a recycled asphalt product comprises contacting a fiber reinforced composite material with a solvent, converting at least some of the fiber reinforced composite material into a liquid product, and contacting the liquid product with a hard asphalt to produce a softened asphalt with preselected properties. The fiber reinforced composite material may comprising a solid organic thermoset material and fibers.

In one embodiment, the converting step comprises reclaiming at least some of the fibers of the fiber reinforced composite material and wherein the recycling step comprises contacting the rejuvenated asphalt with the reclaimed fibers to produce a fiber reinforced asphalt product.

In one embodiment, the liquid product is an oil. In one embodiment, the oil is a liquid at a temperature of 25° C. and a pressure of one atmosphere.

In one embodiment, the solvent is an amine, alcohol, carboxylic acid, phenolic acid, or combination thereof. In one embodiment, the solvent comprises a linear alkyl chain of at least 6 carbon atoms. In one embodiment, the solvent comprises fatty acids, fatty alcohols, fatty amines, ethers, esters, aldehydes, and/or ketones produced from renewable triglyceride or lipid sources. In one embodiment, the solvent is derived from pine. In one embodiment, the solvent is derived from derived from waste triglyceride oils. In one embodiment, the waste triglyceride oils are waste cooking oils. In one embodiment, the solvent is abietic acid, abietyl amine, or a combination thereof.

In one embodiment, the fiber reinforced composite material is selected from the group comprising fiberglass and carbon fiber. In one embodiment, the fibers of the fiber composite material are glass, carbon, metal, synthetic polymers, natural fibers, or combinations thereof. In one embodiment, the fiber reinforced composite material is derived from wind turbine blades, boat hulls, automotive parts, aviation parts, aerospace parts, space equipment, military equipment, sporting goods, construction materials, pipes and tanks, and/or electronics. In one embodiment, the fiber reinforced composite material is fiberglass derived from wind turbine blades.

In one embodiment, the contacting and converting steps are performed in a continuous operation.

In one embodiment, the hard asphalt and/or the softened asphalt comprises asphalt shingles. In one embodiment, the converting step comprises heating the fiber reinforced composite material to a temperature of 260 to 400° C.

In one embodiment, the solvent is selected to tune the properties of the softened asphalt. In one embodiment, the liquid product restores relaxation properties to the softened asphalt as determined by the m-value. In one embodiment, the liquid product improves the $\Delta$Tc of the softened asphalt. In one embodiment, the hard asphalt is an unaged or aged polymer modified asphalt.

It has been found that by reacting the epoxy by thermochemical methods with materials amines, alcohols, or acids (typically carboxylic) low viscous oils can be produced which have good compatibility with asphalt and can soften hard grade asphalt, polymer modified asphalt, aged asphalt as reclaimed asphalt pavement (RAP) and reclaimed asphalt shingles (RAS). This allows these products to be used as softeners (PG adjusters) recycling agents or rejuvenators. Adding renewable carbon, and green chemistry practices, to modify the products by fatty amines, fatty acids and fatty alcohols are preferred to improve sustainability.

Solvents, such as fatty alcohols, amines and acids, produced from triglyceride oils, lipids, or phenolic lipids (anacardic acids), are preferred, but other similar solvent including longer straight-chained and branched-chained molecules produced from petrochemicals, such as during the Shell Higher Olefin Process, or during the ExxonMobil process to produce the branched Exxal products. Other types of naturally derived solvents, such as those from pine including abietic acid, abietyl amine or other rosin and other materials, can be used to enhance or tune the properties. Other solvents derived from gums, algae, bacteria, wood, and other biomass can also be used to tune properties or make better use of regionally available feedstocks. Other types of alcohols such as phenolic-based (including cardanol) or cyclic-based, as in the case of sterols, can be used to tune properties.

In some embodiments, the softened asphalt of the present methods may be reclaimed asphalt pavement (RAP). In other embodiments, the softened asphalt of the present methods may be in the form of reclaimed asphalt shingles (RAS).

In some embodiments, the liquid product of the present methods may be a soft oil. In some embodiments, the soft oil can be useful for rejuvenators for RAP and RAS to aid in pavement or shingle rejuvenation, respectively.

In some embodiments, the soft oil may be used as a rejuvenator to soften oxidized asphalt that has been air blown, visbroken, has high wax, is oxidatively sensitive, is produced using partially upgraded residues or catalytically upgraded.

In some embodiments, the liquid product of the present methods may be used as a rejuvenator to restore relaxation properties to aged pavements or shingles as determined by the m-value. In some embodiments, the liquid product of the present methods may be used as a rejuvenator to improve $\Delta$Tc. In some embodiments, the liquid product of the present methods may be used as a rejuvenator to decrease the upper PG. In some embodiments, the liquid product of the present methods may be used as a rejuvenator to decrease intermediate PG. In some embodiments, the liquid product of the present methods may be used as a rejuvenator to decrease lower PG. In some embodiments, the liquid product of the present methods may be used as a rejuvenator to decrease the softening point. In some embodiments, the liquid product of the present methods may be used as a rejuvenator to decrease the ring and ball softening point. In some embodiments, the liquid product of the present methods may be used as a rejuvenator to increase the penetration grade.

In some embodiments, the liquid product of the present methods may be used as a rejuvenator to improve performance of unaged or aged polymer modified asphalt. In one embodiment, the hard asphalt is an aged polymer modified asphalt. In one embodiment, the hard asphalt is an unaged asphalt. In one embodiment, the hard asphalt is an unaged polymer modified asphalt. In one embodiment, the hard asphalt is an aged polymer modified asphalt.

In some embodiments, the liquid product of the present methods may be used as a base or an additive for asphalt blending applications to lower upper and lower temperature properties—pass certain PG grade specifications for given climatic and traffic conditions according to the SuperPave map.

In some embodiments, the liquid product of the present methods may be used as an additive to improve performance of polymer modified asphalt.

In some embodiments, the liquid product of the present methods may be used as an additive to improve recycled plastic in modified asphalts.

In some embodiments, the liquid product of the present methods may be used as an additive to improve pyrolyzed or devulcanized rubber modified asphalts.

In some embodiments, the liquid product of the present methods may be used as an additive for warm-mix asphalt applications.

In some embodiments, the liquid product of the present methods may be used as an additive for asphalt compaction aids.

In some embodiments, the solid organic thermoset material may comprise epoxy resins or other polymers.

In some embodiments, the fibers of the fiber reinforced composite material may comprise glass, carbon, metal, synthetic polymers or natural fibers.

In some embodiments, the converting step may comprise thermochemical processing of the solvent and fiber reinforced composite material at a temperature of 20-400° C.

In some embodiments the contacting and/or converting steps may comprise batch, semi-batch, semi-continuous or continuous processes with or without countercurrent configurations.

In some embodiments, the fiber reinforced composites may be derived from wind turbine blades, transportation, boat hulls, automotive parts, aviation equipment, aerospace equipment, space equipment, military/defense equipment, sporting goods, construction materials, pipes and tanks, and/or electronics.

In some embodiments, the solvent may be from synthetic sources using petroleum, coal or biomass feedstocks. In some embodiments, the solvent comprises acids, bases, amines, alcohols, phenols, ethers, esters, aldehydes, ketones, and/or combinations thereof.

In some embodiments, the solvent may contain linear, branched, cyclic, aromatic carbon chains to tune solubility, compatibility, viscosity and molecular weight. The solvents may have one functional group or multiple functional groups The recovered fibers can be recycled in but not limited to new thermoset fiber reinforced composites, fiber reinforced asphalt, fiber reinforced concrete, and in construction of new roofing shingles.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING CHEMICAL COMPOUNDS AND NOMENCLATURE

Figure 1:
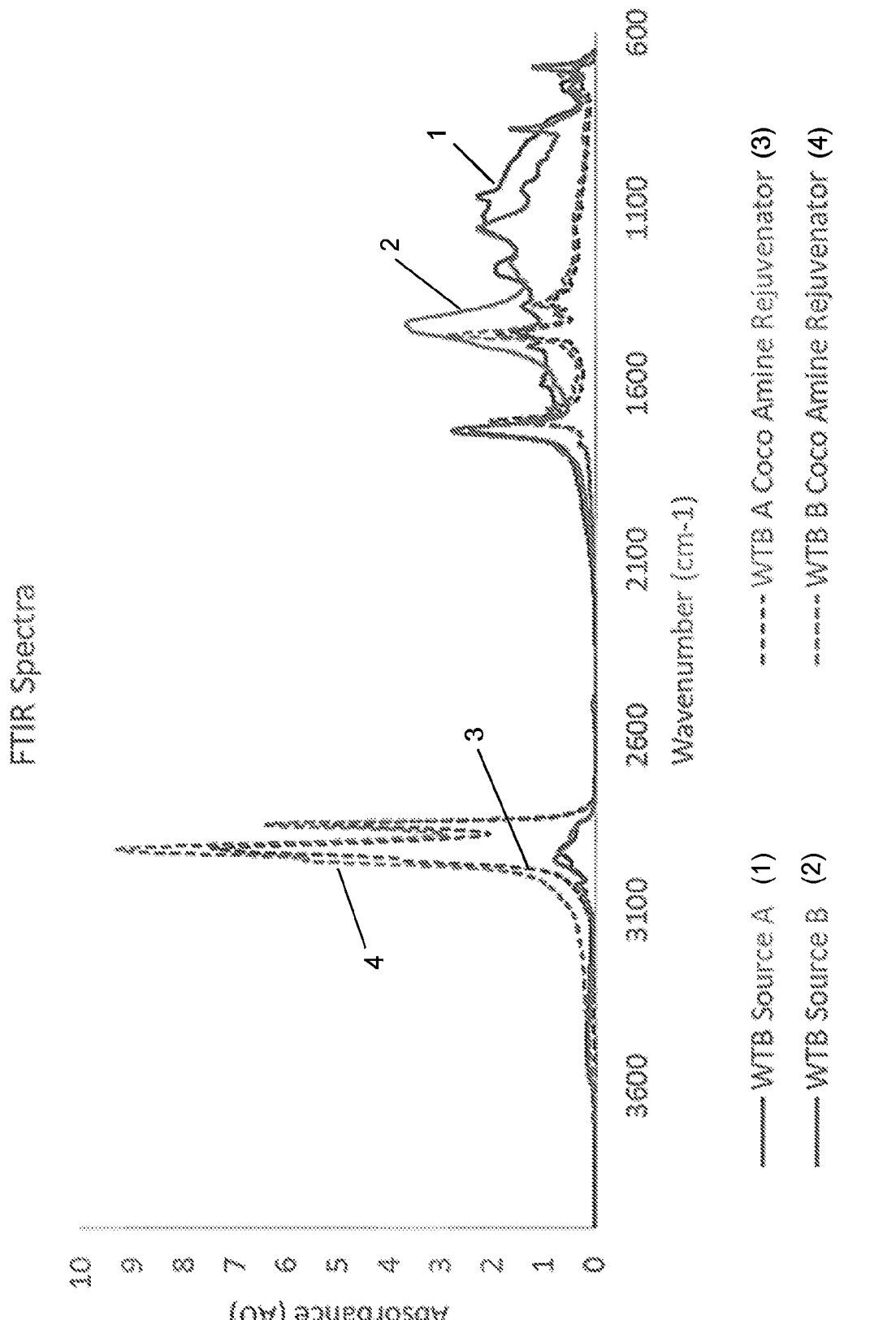
FIG. 1: FTIR for WTB Source A and Source B and corresponding coco amine rejuvenator products from both sources.

In general, the terms and phrases used herein have their art-recognized meaning, which can be found by reference to standard texts, journal references and contexts known to those skilled in the art. The following definitions are provided to clarify their specific use in the context of the invention.

As used herein, the term "fiber reinforced composite" means a material having fibers dispersed in a continuous matrix of an organic thermoset material. The fibers may be aligned (e.g., woven) or randomly dispersed. Examples of fiber reinforced composite materials include fiberglass and carbon fiber. Examples of fibers useful for reinforced composite materials include glass, carbon, metal, synthetic polymers, and natural fibers.

As used herein, the term "organic thermoset" means an organic polymer material that has been cured to create a cross-linked structure. Curing of an organic thermoset polymer may be initiated via, for example, heat or electromagnetic radiation such as UV light.

As used herein, the term "recycled asphalt product" means an asphalt product produced via a feedstock that includes asphalt. One example of a recycled asphalt product is an asphalt road surface that has been produced via a process whereby an aged asphalt road surface is demolished, partially liquefied, optionally modified via one or more asphalt modifiers, and then re-laid as a new asphalt road surface.

As used herein, the term "fiber reinforced asphalt product" means an asphalt product reinforced with one or more fibers. Fibers useful in fiber reinforced asphalt products include glass, carbon, metal, synthetic polymers, and natural fibers.

As used herein, the term "aged asphalt" means asphalt that has undergone sufficient aging to produce deleterious changes in the rheological properties of the binding agents in the asphalt. The aging process may include changes in chemical composition of the asphalt binders, including, for example, oxidation, volatilization, and/or steric hardening of hydrocarbon based molecules in the binders. The aging process may be effected by variables such as time, precipitation, and/or UV exposure during construction and its service life period. Aging may cause the asphalt material to stiffen and become brittle, which affects the durability and may leads to a high potential for cracking.

As used herein, the term "polymer modified asphalt" means asphalt produced via a process whereby traditional asphalt binders are modified with one or more polymers during the asphalt production process.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Figure 11:
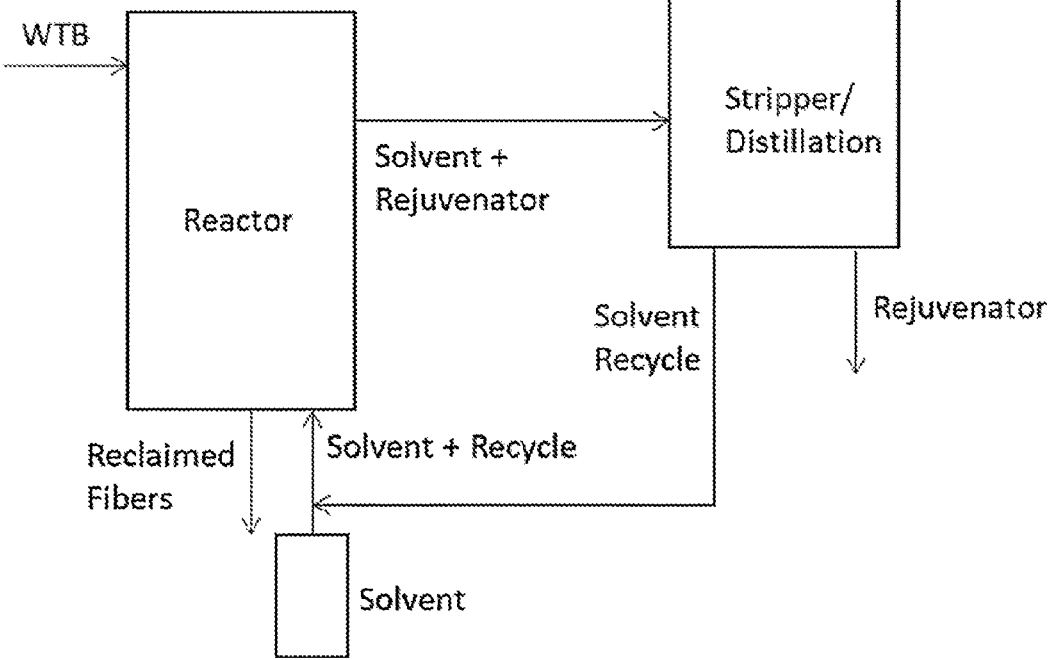
FIG. 11: A process flow diagram of an exemplary method in accordance with the present disclosure.

Turning now to FIG. 11, one exemplary embodiment of a schematic flow diagram of process for producing asphalt materials from wind turbine blades is shown. In the illustrated embodiment, fiber reinforced composite material from wind turbine blades is fed into a reactor along with solvent. The solvent contacts the fiber reinforced composite material, converting at least some of it to a liquid product. The liquid product and residual solvent is transferred from the reactor to a stripper and/or distillation operation to separate solvent from liquid product. The recovered solvent is fed back into a solvent storage vessel. The liquid rejuvenator product is then incorporated into asphalt products to improve the properties of the asphalt.

The invention can be further understood by the following non-limiting examples.

Example 1. Wind Turbine Blade Extraction Using Fatty Amines and Fatty Alcohols As the number of wind farms increase—and as turbines and blades become larger with more advanced designs capable of producing more energy—there is growing distillation to provide a light brown oil. 74% of fiberglass was recovered and 38% of rejuvenator were produced.

Experiment B: WTB drillings form Source B (10 g) were charged into a Parr reactor and coco amine (25.8 g) were added. The suspension was purged with inert gas, stirred and brought up to 360° C. for 180 minutes. The contents were removed from the reactor and filtered and rinsed with toluene. Volatiles were removed from the filtrate by vacuum distillation to provide a light brown oil. 63% of fiberglass was recovered and 84% of rejuvenator were produced. A similar experiment was performed using older generation WTB from Source A. Table 1 shows CHNOS characterization data for WTB Source A and B and coco amine rejuvenator product from the two sources. Table 2 shows Saturates, Aromatics, Resins-Asphaltene Determinator (SAR-AD)[10] data for the two coco amine products. FIG. 1 shows Fourier transform infrared spectroscopy for WTB Source A and B as the coco amine rejuvenator products.

TABLE 1

CHNOS data for WTB Source A and Source B and corresponding coco amine rejuvenator products from both sources.

| Sample Name | Carbon % w/w | Hydrogen % w/w | Nitrogen % w/w | Oxygen % w/w | Sulfur % w/w | Ash % w/w |
|---|---|---|---|---|---|---|
| WTB A | 15.53 | 1.17 | 0.02 | 5.49 | <0.01 | 75.61 |
| WTB B | 25.29 | 2.06 | 0.01 | 11.25 | <0.01 | 61.25 |
| WTB A Ash Free | 69.92 | 5.27 | 0.09 | 24.72 | — | |
| WTB B Ash Free | 65.50 | 5.34 | 0.03 | 29.14 | — | |
| WTB A, Coco Amine Product | 79.01 | 9.67 | 2.79 | 6.71 | 0.02 | — |
| WTB B, Coco Amine Product | 82.00 | 12.23 | 2.34 | 3.45 | 0.01 | — |

TABLE 2

SAR-AD data for coco amine products from WTB Source A and Source B.

| Sample ID | Maltenes | | | | | Asphaltenes | | | |
|---|---|---|---|---|---|---|---|---|---|
| | Sat | Aro 1 | Aro 2 | Aro 3 | Resins | $CyC_6$ | Tol | $CH_2Cl_2$ | Total |
| WTB A, Coco Amine | 0 | 0 | 1.09 | 31.44 | 61.49 | 1.63 | 3.72 | 0.64 | 5.99 |
| WTB B, Coco Amine | 1.74 | 2.2 | 9.29 | 55.1 | 31.31 | 0.13 | 0.2 | 0.04 | 0.37 | demand for new wind turbine blade (WTB) materials, not only for these new farms, but also to replace old turbines. Additionally, WTB must be replaces every 15-20 years. WTBs are the largest single use composite material produced in the word.[6] These highly engineered composites cost hundreds of thousands of dollars and weight tens of thousands of pounds with a significant portion of the ridged structure coming from mostly glass fiber or some carbon fiber impregnated with epoxy. Estimates form the National Renewable Energy Laboratory estimates 2.2 million tons of WTB waste by 2050 in the US.[7] Other reports show worldwide WTB waste reaching 43 million by 2050.[8] Other estimates suggest that there will be 100,000 tons/year of end of life WTB by 2030.[9]

Experiment A: WTB drillings from Source A (20 g) were charged into a Parr reactor and decylamine (37.5 g) were added. The suspension was purged with inert gas, stirred and brought up to 360° C. for 180 minutes. The contents were removed from the reactor and filtered and rinsed with toluene. Volatiles were removed from the filtrate by vacuum Experiment C: WTB drillings form Source B (20 g) were charged into a Parr reactor and tallow amine (35.8 g) were added. The suspension was purged with inert gas, stirred and brought up to 360° C. for 180 minutes. The contents were removed from the reactor and filtered and rinsed with toluene. Volatiles were removed from the filtrate by vacuum distillation to provide a light brown oil that solidified into a waxy solid upon cooling to ambient temperature. 64% of fiberglass was recovered and 29.4 g of rejuvenator or warm-mix product were produced.

Experiment D: WTB drillings from Source B (20 g) were charged into a Parr reactor and dodecanol (20 g) were added. The suspension was purged with inert gas, stirred and brought up to 360° C. for 30 minutes. The contents were removed from the reactor and filtered and rinsed with toluene. Volatiles were removed from the filtrate by vacuum distillation to provide a light brown oil. 64% of fiberglass was recovered and 6.4 g of rejuvenator were produced.

Experiment E: Flow through semi-batch/semi-continuous extractions were performed using WTB from Source B (7 g) and flowing coco amine (100 mL) through the reactor held at 365° C. with 500 psi back pressure at a rate of 20 mL/hr.

Figure 2:
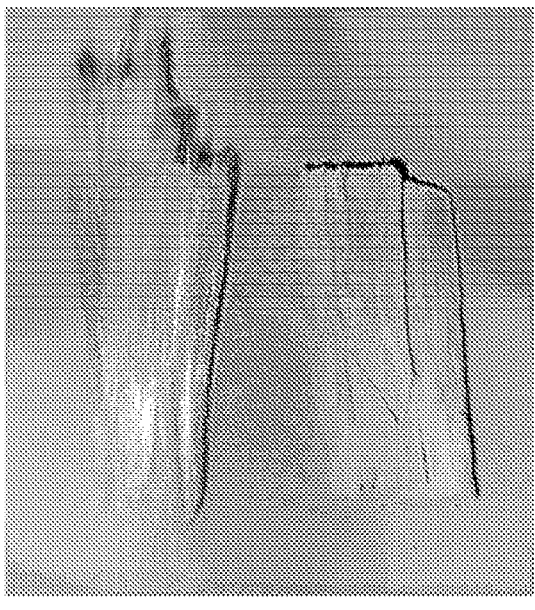
FIG. 2: Photograph showing glass fibers (left) recovered from WTB chunks (right) after thermochemical reaction.

After the extraction was completed, the reactor contents were rinsed with toluene and filtered to provide the glass fibers. 39% of the WTB was extracted and 4.58 g of rejuvenator was produced. FIG. 2 shows a piece of WTB and the glass fibers after extraction and a piece of the WTB from the turbine root area.

Experiment F: A similar experiment to Example E was performed except dodecanol was used for the solvent. 37% of the WTB was extracted and 1.7 g of rejuvenator was produced.

Example 2. Carbon Fiber Composites

Many lightweight and high-strength applications use considerable amounts of fiber reinforced composites particularly in the aerospace, aviation, automobile, and sporting goods industries, in addition to, of course, military applications. Increasing amounts of carbon fiber composites are being targeted to replace body components and structural components in vehicles to reduce their weight. More than 1000,000 tons of CF are produced and demand has grown around 11% per year due to increasing global demand. Around 30% of carbon fiber ends up as waste during production. Some technologies are specifically targeting these industrial waste streams to recover the expensive carbon fibers for reuse, but few are being targeted for post-consumer streams. Similar advances in CF recycling have been used as in the case of WTB recycling.[11]

Experiment E: Pre-impregnated CF composites (20 g) were charged into a stirred Parr reactor and coco amine (50 g) were added. The suspension was purged with inert gas, stirred and brought up to 360° C. for 180 minutes. The contents were removed from the reactor and filtered and rinsed with toluene. Volatiles were removed from the filtrate by vacuum distillation to provide a light brown oil. 82% of fiberglass was recovered and 28 g of rejuvenator were produced.

Figure 3:
FIG. 3: CF composite (left) and recovered CF (right) after thermochemical treatment.

Experiment F: For this experiment, 90 mL of dodecanol was contacted with the chopped CF composite at 360° C. at a flow rate of 20 mL/min and 300 psi. At the end of the experiment 73% insoluble components were collected and 2.03 g of residue was collected. FIG. 3 shows the chopped CF composite and the recovered CF after thermochemical treatment.

Example 3. Printed Circuit Board E-Waste

Non-metallic components of printed circuit boards (PCB) consist of a thermoset resin and fiberglass reinforcement along with other components which makes recovery and recycling problematic resulting in zero value so that they are usually dumped at disposal sites. 12 In 2019 it was estimated that 53.6 Mt of waste was produced and that this could grow to 74.7 Mt by 2030.13 It is estimated that 25% of e-waste is collected for recycling while the remainder is landfilled. 14 Most PCB are produced using flame resistant epoxy resin composite with a woven fiberglass cloth. The self-extinguishing capabilities from the FR-4 epoxy resin usually contains a bromine component and well as other components. Significant progress has been made in recovering metals from PCB, however the complexities in contaminants from various metallurgies, ceramics, other chip components and the flame retardant non-conducting substrates, consist of a range of other polymers, silica and metal oxides, making recovery and utilization of the fiberglass or resin extremely difficult. 10 One of the most successful methods for recovering solder is to use a combination of heated air and pulse jet. However, this is only mildly successful for small surface mount components (like resistors) and is more effective for removing integrated components and material components.[10] However, most technologies have not focused on the reuse or recycling of components form the epoxy resin fiber reinforced PCB substrates.

Figure 4:
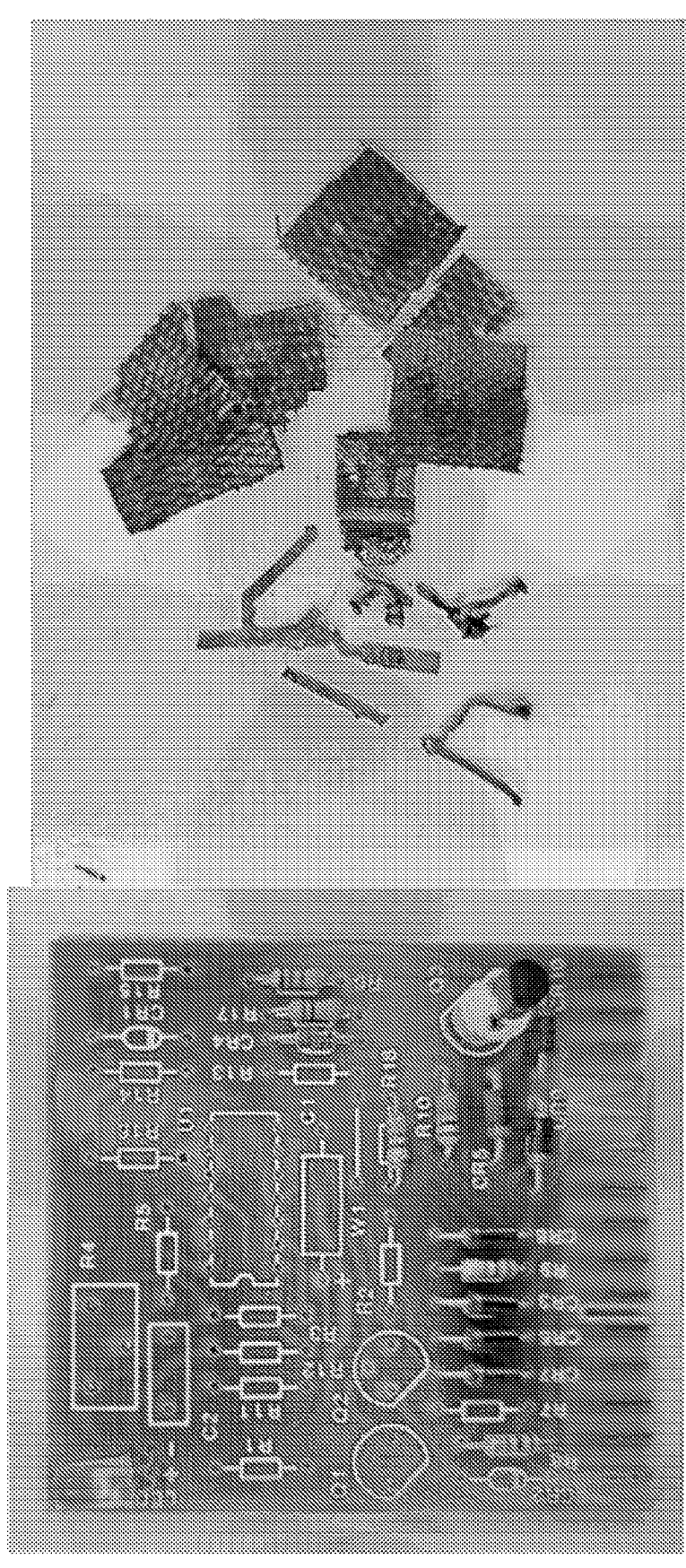
FIG. 4: Photos of an end-of-life PCB (left) that was thermochemical digested to produce the metal components and the woven fiberglass mat (right).

Experiment G: The thermochemical method using dodecanol to remove the epoxy resin component shown in FIG. 4. For this experiment, 90 mL of dodecanol was contacted with the chopped PCB (6.9 g) at 360° C. at a flow rate of 20 mL/min and 300 psi. At the end of the experiment 68% insoluble components were collected and 4.71 g of residue was collected. FIG. 4 shows a PCB before and after thermochemical treatment. It should be noted that due to the various brominated components and other components to make PCB flame retardant can create a low level of coke like material. This is shown as the black powders on the recovered glass fiber mats in FIGS. 4 and 5.

Figure 5:
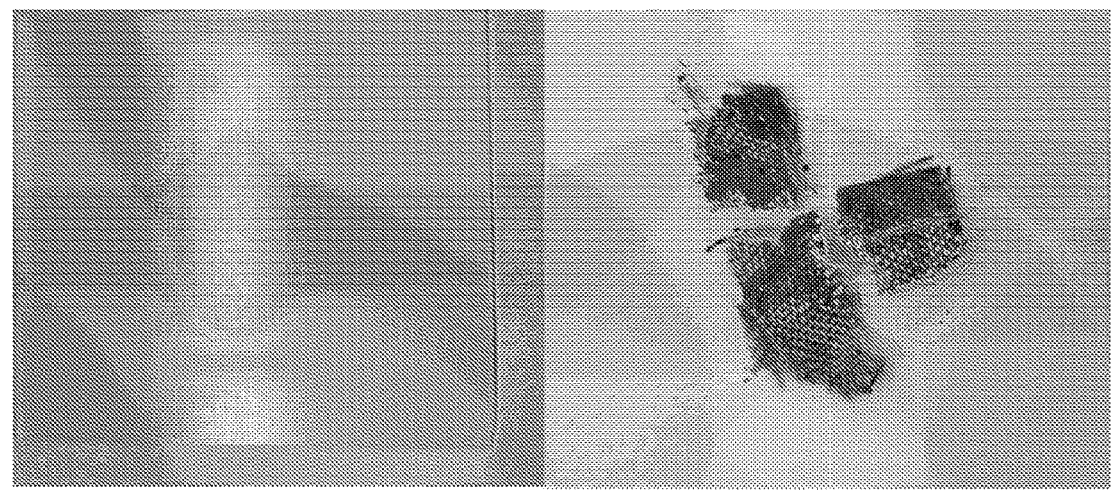
FIG. 5: Photos of $\frac{1}{32}$" FR-4 Garolite sheet (left) that was thermochemical digested to produce the metal components and the woven fiberglass mat (right).

Experiment H: A new FR-4 Garolite sheet $\frac{1}{32}$" thick composite panel was chopped into pieces and 7.0 g was extracted under the same conditions as in Experiment G. At the end of the experiment 94% insoluble components were collected and 1.8 g of residue was collected. FIG. 5 shows a PCB before and after thermochemical treatment.

Use of Soft Oils from Epoxy Composites at Recycling Agents/Rejuvenators

Rejuvenator products from WTB Source B were tested in various aged asphalts to show how the stiff oxidized material can be softened. The asphalt source tested contained difficult bases such an air blown asphalt (AAE-1) a high molecular weight high wax asphalt (AAM-1) and a highly oxidation sensitive asphalt (AAF-1), and a good quality paving grade asphalt (BI-0003).

Figure 6:
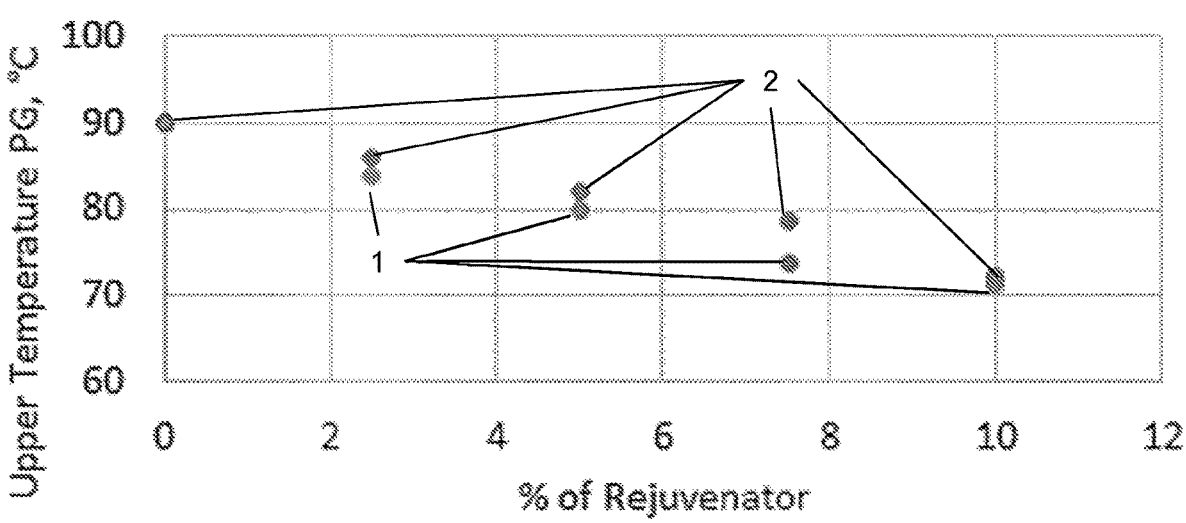
FIG. 6: Plot showing the change in the upper PG temperature for WTB Source B coco amine rejuvenator and a commercial vegetable oil based rejuvenator.

Laboratory oxidized/aged asphalts were prepared by RTFO[15] followed by 40 hrs PAV (2PAV)[16]. This produces a highly aged asphalt representing approximately the top 0.5" of an aged asphalt after more than 10 years of in-service life. BI-0003 RTFO/2PAV was treated with 2.5, 5, 7.5 and 10% of the WTB Source B rejuvenator and a commercial vegetable oil based rejuvenator. The upper and lower temperature PG[17] results are shown in Table 3 and FIG. 6.

TABLE 3

Upper and lower PG critical temperature data for BI-0003 RTFO/2PAV
and the aged asphalt treated with WTB Source B coco amine
product and a commercial vegetable oil based product.

| RTFO/2PAV, % WTB B, Coco Amine | Upper PG, ° C. | Lower PG Properties, ° C. Tc(S) | Tc(m) | Tc(S) − Tc(m) ΔTc |
|---|---|---|---|---|
| BI-0003 2PAV Control | 93.1 | −23.8 | | −6.9 |
| BI-0003 2PAV Vegetable Oil 2.5% | 86.1 | Below −30 | −16.9 | — |

TABLE 3-continued

Upper and lower PG critical temperature data for BI-0003 RTFO/2PAV
and the aged asphalt treated with WTB Source B coco amine
product and a commercial vegetable oil based product.

| RTFO/2PAV, % WTB B, Coco Amine | Upper PG, ° C. | Lower PG Properties, ° C. | | Tc(S) − Tc(m) ΔTc |
|---|---|---|---|---|
| | | Tc(S) | Tc(m) | |
| BI-0003 2PAV Vegetable Oil 5% | 81.9 | Below −30 | −25.0 | — |
| BI-0003 2PAV Vegetable Oil 7.5% | 78.6 | Below −30 | Below −30 | — |
| BI-0003 2PAV Vegetable Oil 10% | 72.8 | Below −30 | Below −30 | — |
| BI-0003 2PAV Turbine Additive 2.5% | 83.9 | Below −30 | Below −30 | — |
| BI-0003 2PAV Turbine Additive 5% | 79.8 | Below −30 | Below −30 | — |
| BI-0003 2PAV Turbine Additive 7.5% | 73.9 | Below −30 | Below −30 | — |
| BI-0003 2PAV Turbine Additive 10% | 71.3 | Below −30 | Below −30 | — |

Figure 7A:
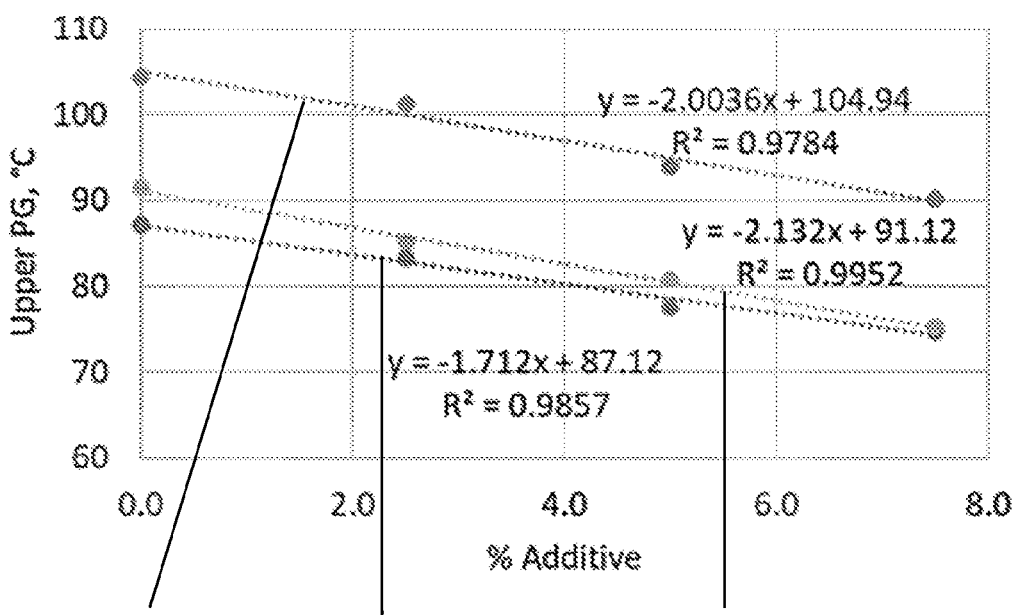
FIG. 7A: Upper PG and (FIG. 7B) Tc(m-value) for various aged asphalts treated with various amounts of WTB Source B coco amine rejuvenator.
Figure 7B:
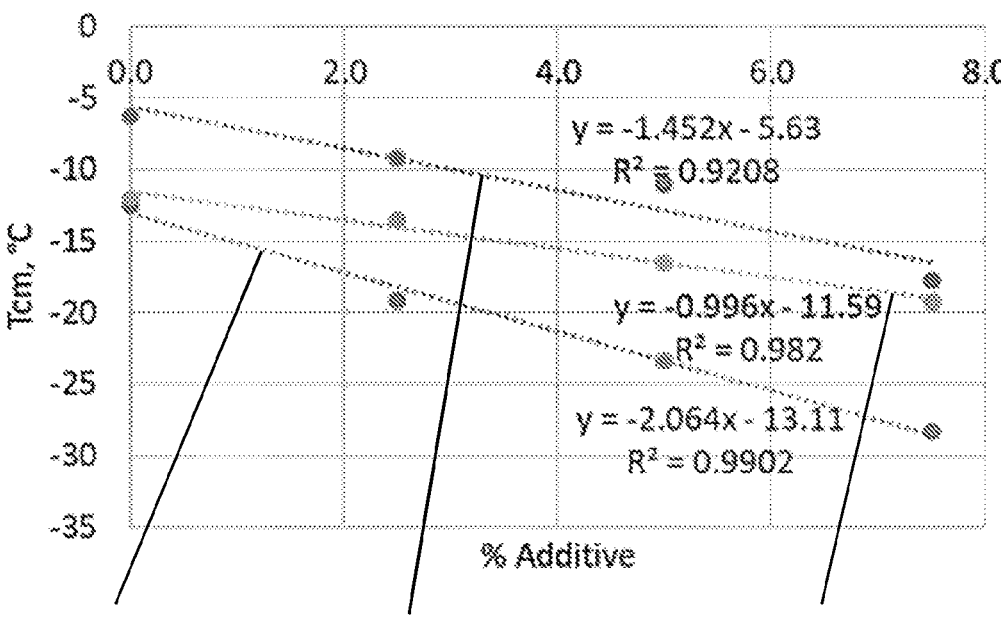
Figure 8:
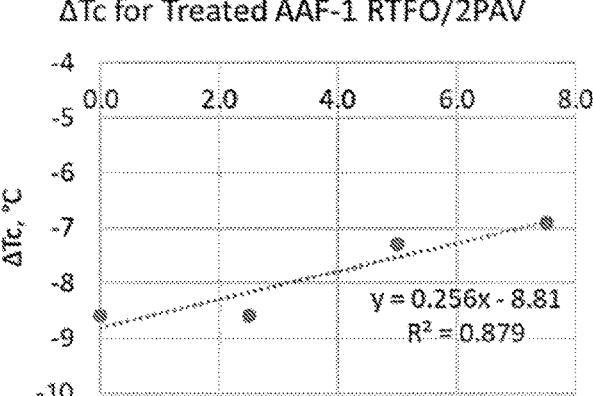
FIG. 8: ΔTc for AAF-1 treated with various amounts of WTB Source B coco amine rejuvenator.

Results show that a WTB rejuvenator performs as well as a commercial vegetable oil based rejuvenator for softening aged asphalt at the upper PG. Additional blend were made with AAE-1, AAF-1 and AAM-1 and the results are shown in Table 4 and FIGS. 7A-7B. The WTB coco amine rejuvenator also showed the ability to selectively improve the relaxation parameter Tc(m-value) leading to an increase, or improvement, in the ΔTc (ΔTc=Tc(S)−Tc(m))[18]. The ΔTc value is related to cracking phenomena and improvements in this metric will reduce potential damage from cracking. FIG. 8 shows the improvement in the ΔTc value for AAF-1 with increasing WTB coco amine rejuvenator.

Figure 9:
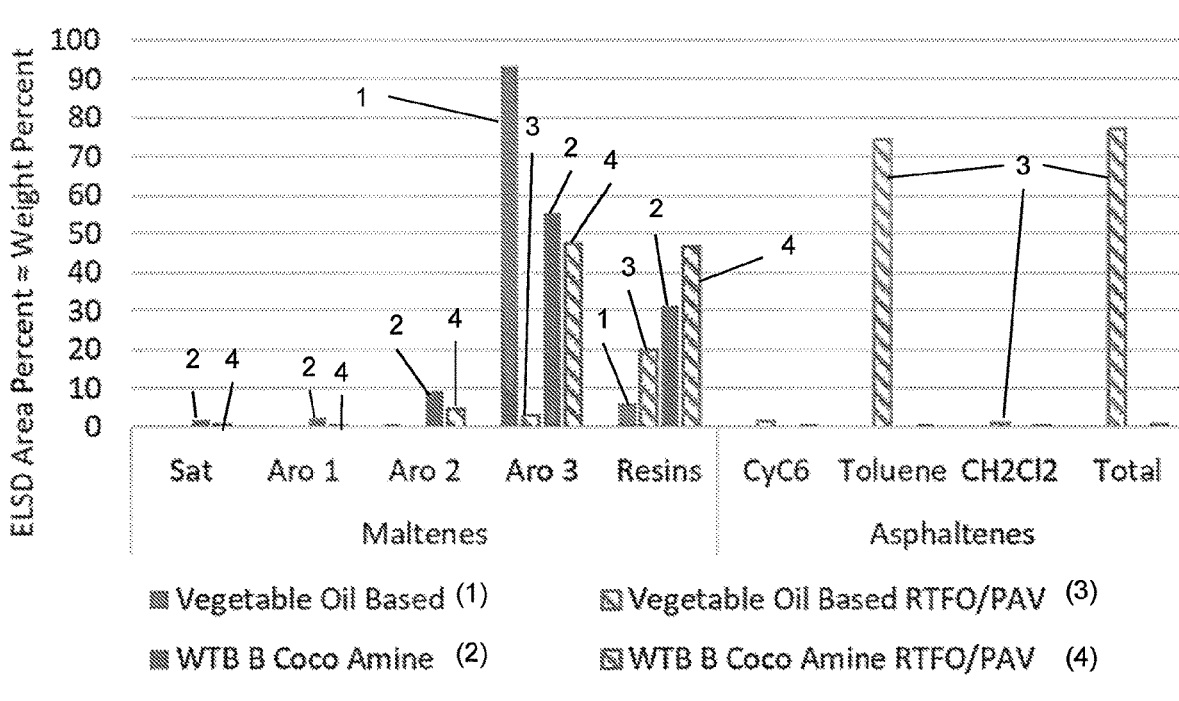
FIG. 9: Plot showing the change in SAR-AD composition for WTB Source B coco amine rejuvenator and a commercial vegetable oil based rejuvenator.

The oxidative stability of the WTB Source B coco amine rejuvenator was compared to a commercial vegetable oil based rejuvenator by comparing the composition by SAR-AD[19] before and after RTFO/PAV aging. Results show that the composition of the WTB rejuvenator changed very little compared to the vegetable oil based rejuvenator (Table 5 and FIG. 9). A significant change in the composition and solubility of additives can change the compatibility of additives within an asphalt and can lead to premature failure.

TABLE 5

SAR-AD composition data for WTB B coco amine rejuvenator and vegetable
oil based commercial rejuvenator before aging and after RTFO/PAV aging.

| Sample ID | Maltenes | | | | | Asphaltenes | | | |
|---|---|---|---|---|---|---|---|---|---|
| | Sat | Aro 1 | Aro 2 | Aro 3 | Resins | CyC$_6$ | Toluene | CH$_2$Cl$_2$ | Total |
| Vegetable Oil Based | 0.00 | 0.00 | 0.80 | 93.05 | 6.08 | 0.00 | 0.07 | 0.00 | 0.07 |
| Vegetable Oil Based RTFO/PAV | 0.00 | 0.00 | 0.00 | 2.88 | 19.94 | 1.66 | 74.53 | 0.99 | 77.18 |
| WTB B, Coco Amine | 1.74 | 2.20 | 9.29 | 55.10 | 31.31 | 0.13 | 0.20 | 0.04 | 0.37 |
| WTB B Coco Amine RTFO/PAV | 0.57 | 0.41 | 4.60 | 47.27 | 46.63 | 0.11 | 0.33 | 0.08 | 0.52 |

TABLE 4

Upper and lower critical temperature PG data for
various aged asphalts treated with various amounts
of WTB Source B coco amine rejuvenator.

| RTFO/2PAV, % WTB B, Coco Amine | Upper PG, ° C. | Lower PG Properties, ° C. | | Tc(S) − Tc(m) ΔTc |
|---|---|---|---|---|
| | | Tc(S) | Tc(m) | |
| AAE-1, 0% | 104.4 | −23.9 | −12.5 | −11.4 |
| AAE-1, 2.5% | 101.2 | Below −30 | −19.2 | — |
| AAE-1, 5% | 94.01 | Below −30 | −23.4 | — |
| AAE-1, 7.5% | 90.1 | Below −30 | −28.3 | — |
| AAF-1, 0% | 87.2 | −14.9 | −6.3 | −8.6 |
| AAF-1, 2.5% | 83.2 | −17.8 | −9.2 | −8.6 |
| AAF-1, 5% | 77.6 | −18.3 | −11.0 | −7.3 |
| AAF-1, 7.5% | 74.8 | −24.7 | −17.8 | −6.9 |
| AAM-1, 0% | 91.5 | −24.6 | −12.0 | −12.6 |
| AAM-1, 2.5% | 85.1 | −25.2 | −13.5 | −11.7 |
| AAM-1, 5% | 80.7 | −26.7 | −16.5 | −10.2 |
| AAM-1, 7.5% | 75.2 | Below −30 | −19.3 | — |

Figure 10:
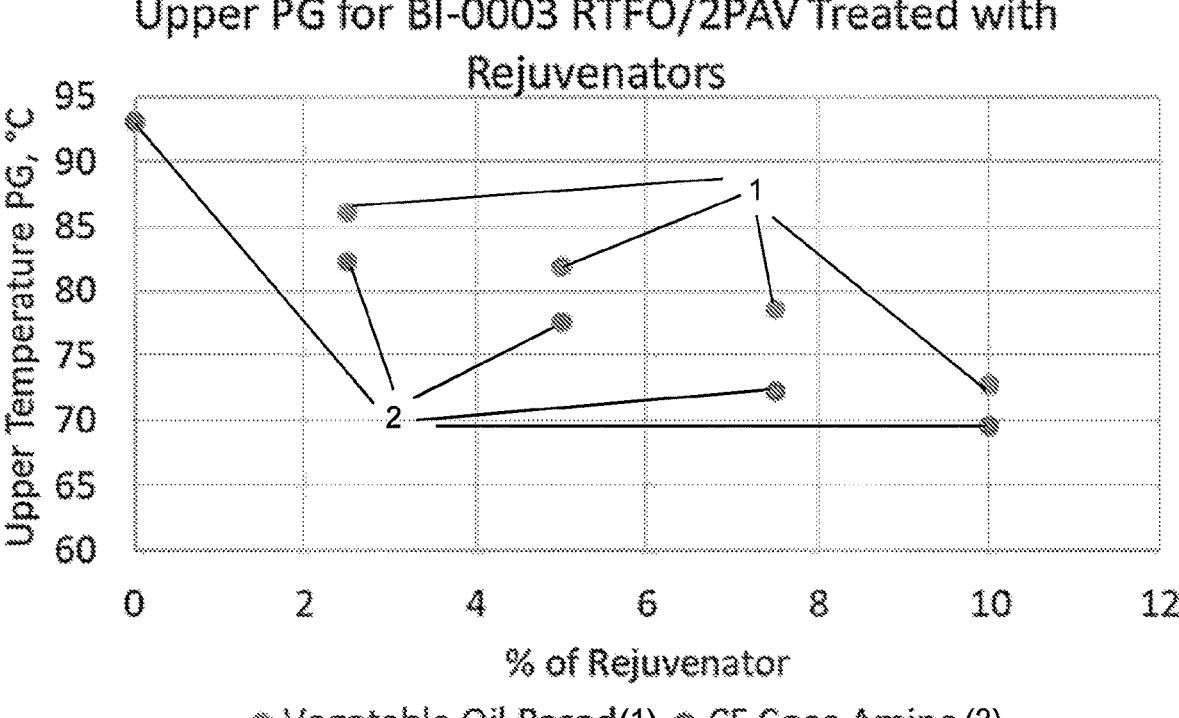
FIG. 10: Upper PG for BI-0003 with fixed amounts of CF coco amine rejuvenator and a commercial vegetable oil based rejuvenator.

Additional blends were produced from the CF coco amine rejuvenator using BI-0003 RTFO/2PAV which also showed significant softening with performance consistent with a commercial vegetable oil based rejuvenator. Upper temperature PG data for the CF coco amine rejuvenator in the aged asphalt is shown in FIG. 10.

REFERENCES 1. https://www.compositesworld.com/articles/2021-cw-top-shops-highlights-strengths-of-top-composites-facilities
2. Bunsell, A. R.; Joannes, S.; Thionnet, A. Fundamental of Fibre Reinforced Composite Materials. 2nd Edition. CRC Press Taylor and Francis Group. 2021. Boca Raton, FL.
3. Gopalraj, S. K and Karki, T. 2020. A Review on the Recycling of Waste Carbon Fiber/Glass Fiber-reinforced Composites: Fiber Recovery, Properties and Life-cycle Analysis. SN Applied Sciences (2020) 2:433.
4. Gopalraj, S. K and Karki, T. 2020. A Review on the Recycling of Waste Carbon Fiber/Glass Fiber-reinforced Composites: Fiber Recovery, Properties and Life-cycle Analysis. SN Applied Sciences (2020) 2:433.

5. Cousins, D. S. et al. 2019. Recycling Glass Fiber Thermoplastic Composites form Wind Turbine Blades. J. of Cleaner Production. 209: 1252-1263. https://doi.org/10.1016/j.jclepro.2018.10.286

6. https://www.compositesworld.com/articles/wind-turbine-blades-big-and-getting-bigger 7. https://www.nrel.gov/news/program/2021/nrel-research-identifies-motivations-methods-for-achieving-a-circular-economy-for-wind-energy.html 8. Liu, P.; Barlow, C. Y. 2017. Wind Turbine Blade Waste in 2050. Waste Management 62: 229-240.

9. Gopalraj, S. K.; Karki, T. 2020. A Review on the Recycling of Waste Carbon Fibre/Glass Fibre-reinforced Composites: Fibre Recovery, Properties and Life-cycle Analysis. SN Applied Sciences (2020) 2:433.

10. U.S. Ser. No. 10/662,384, Methods for Analyzing Hydrocarbons and Hydrocarbon Blends for Chemical Compositions. May 26, 2020. US 20130067991, Hydrocarbon Separation and Analysis Apparatus and Methods. Mar. 21, 2013. Boysen, R. B.; Schabron, J. F. The Automated Asphaltene Determinator Coupled with Saturates, Aromatics, Resins Separation for Petroleum Residua Characterization. Energy Fuels 2013, 27, 4654-4661. Adams, J. J.; Schabron, J. F.; Boysen, R. Quantitative Vacuum Distillation of Crude Oils to Give Residues Amenable to the Asphaltene Determinator Coupled with Saturates, Aromatics, and Resins Separation Characterization. Energy Fuels 2015, 29, 2774-2784. Federal Highway Administration (FHWA), U.S. Department of Transportation. Automated High-Performance Liquid Chromatography Saturate, Aromatic, Resin, and Asphaltene Separation; FHWA, U.S. Department of Transportation: Washington, D.C., 2016; Federal Highway Administration Publication FHWA-HRT-15-055.

11. Pakdel, E. et. al. Recent Progress in Recycling Carbon Fiber Reinforced Composites and Dry Carbon Fiber Wastes. Resources, Conservation and Recycling. 116 (2021) 105340.

12. Sohaili J. et. al. A Review on Printed Circuit Boards Waste Recycling Technologies and Reuse of Recovered Nonmetallic Materials. 2012. International Journal of Scientific and Engineering Research. 3: 1-7.

13. S. Mir and N. Dhawan. A Comprehensive Review on the Recycling of Discarded Printed Circuit Boards for Resource Recovery. Resources, Conservation and Recycling. 178 (2022) 106027.

14. https://www.epa.gov/international-cooperation/cleaning-electronic-waste-e-waste 15. AASHTO T 240 and ASTM D 2872

16. AASHTO R28 and ASTM D6521

17. AASHTO M320

18. AASHTO Provisional Standard PP-113-21. Delta Tc Binder Specification Parameter. FHWA-HIF-21-042. Tech Brief. September 2021

19. U.S. Ser. No. 10/662,384, Methods for Analyzing Hydrocarbons and Hydrocarbon Blends for Chemical Compositions. May 26, 2020. US 20130067991, Hydrocarbon Separation and Analysis Apparatus and Methods. Mar. 21, 2013. Boysen, R. B.; Schabron, J. F. The Automated Asphaltene Determinator Coupled with Saturates, Aromatics, Resins Separation for Petroleum Residua Characterization. Energy Fuels 2013, 27, 4654-4661. Adams, J. J.; Schabron, J. F.; Boysen, R. Quantitative Vacuum Distillation of Crude Oils to Give Residues Amenable to the Asphaltene Determinator Coupled with Saturates, Aromatics, and Resins Separation Characterization. Energy Fuels 2015, 29, 2774-2784. Federal Highway Administration (FHWA), U.S. Department of Transportation. Automated High-Performance Liquid Chromatography Saturate, Aromatic, Resin, and Asphaltene Separation; FHWA, U.S. Department of Transportation: Washington, D.C., 2016; Federal Highway Administration Publication FHWA-HRT-15-055.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for converting a fiber reinforced composite material into a recycled asphalt product, the method comprising:

contacting a fiber reinforced composite material with a solvent, the fiber reinforced composite material comprising:

a solid organic thermoset material; and fibers;

converting at least some of the fiber reinforced composite material into a liquid product; and contacting the liquid product with a hard asphalt to produce a softened asphalt with preselected properties.

2. The method of claim 1, wherein the converting step comprises reclaiming at least some of the fibers of the fiber reinforced composite material and wherein the method further comprises contacting the softened asphalt with the reclaimed fibers to produce a fiber reinforced asphalt product.

3. The method of claim 1, wherein the liquid product is an oil.

4. The method of claim 3, wherein the oil is a liquid at a temperature of 25° C. and a pressure of one atmosphere.

5. The method of claim 1, wherein the solvent is an amine, alcohol, carboxylic acid, phenolic acid, or combination thereof.

6. The method of claim 1, wherein the solvent comprises a linear alkyl chain of at least 6 carbon atoms.

7. The method of claim 1, wherein the solvent comprises fatty acids, fatty alcohols, fatty amines, ethers, esters, aldehydes, and/or ketones produced from renewable triglyceride or lipid sources.

8. The method of claim 1, wherein the solvent is derived from pine.

9. The method of claim 1, wherein the solvent is derived from waste triglyceride oils.

10. The method of claim 9, wherein the waste triglyceride oils are waste cooking oils.

11. The method of claim 1, wherein the solvent is abietic acid, abietyl amine, or a combination thereof.

12. The method of claim 1, wherein the fiber reinforced composite material is selected from the group comprising fiberglass and carbon fiber.

13. The method of claim 1, wherein the fibers of the fiber composite material are glass, carbon, metal, synthetic polymers, natural fibers, or combinations thereof.

14. The method of claim 1, wherein the fiber reinforced composite material is derived from wind turbine blades, boat hulls, automotive parts, aviation parts, aerospace parts, space equipment, military equipment, sporting goods, construction materials, pipes and tanks, and/or electronics.

15. The method of claim 1, wherein the fiber reinforced composite material is fiberglass derived from wind turbine blades.

16. The method of claim 1, wherein the contacting and converting steps are performed in a continuous operation.

17. The method of claim 1, wherein the hard asphalt and/or the softened asphalt comprises asphalt shingles.

18. The method of claim 1, wherein the converting step comprises heating the fiber reinforced composite material to a temperature of 260 to 400° C.

19. The method of claim 1, wherein the solvent is selected to tune the properties of the softened asphalt.

20. The method of claim 1, wherein the liquid product restores relaxation properties to the softened asphalt as determined by the m-value.

21. The method of claim 1, wherein the liquid product improves the ΔTc of the softened asphalt.

22. The method of claim 1, wherein the hard asphalt is an aged polymer modified asphalt.

23. The method of claim 1, wherein the hard asphalt is an unaged asphalt.

24. The method of claim 1, wherein the hard asphalt is an unaged polymer modified asphalt.

25. The method of claim 1, wherein the hard asphalt is an aged polymer modified asphalt.

26. The method of claim 1, wherein the solid organic thermoset material is an organic polymer material that has been cured to create a cross-linked structure.

\* \* \* \* \*